US009670971B2

(12) United States Patent
Okuda et al.

(10) Patent No.: US 9,670,971 B2
(45) Date of Patent: Jun. 6, 2017

(54) POWER TRANSMISSION UNIT FOR VEHICLE (71) Applicant: TOYOTA JIDOSHA KABUSHIKI KAISHA, Toyota-shi (JP)

(72) Inventors: Kouichi Okuda, Toyota (JP); Ryuji Ibaraki, Toyota (JP); Yuji Yasuda, Toyota (JP); Atsushi Tabata, Toyota (JP); Toshiki Kanada, Toyota (JP); Isao Sato, Toyota (JP); Tatsuya Imamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/649,683

(22) PCT Filed: Dec. 25, 2013

(86) PCT No.: PCT/JP2013/084581
§ 371 (c)(1),
(2) Date: Jun. 4, 2015

(87) PCT Pub. No.: WO2014/104056
PCT Pub. Date: Jul. 3, 2014

(65) Prior Publication Data
US 2015/0328974 A1   Nov. 19, 2015

(30) Foreign Application Priority Data

Dec. 27, 2012   (JP) .................................. 2012-285383

(51) Int. Cl.
*B60K 6/405*   (2007.10)
*B60K 6/383*   (2007.10)
(Continued)

(52) U.S. Cl.
CPC ............ *F16D 41/069* (2013.01); *B60K 6/383* (2013.01); *B60K 6/405* (2013.01); *B60K 6/445* (2013.01);
(Continued)

(58) Field of Classification Search
CPC ........................ F16D 41/069; Y10S 903/913
See application file for complete search history.

(56) References Cited

U.S. PATENT DOCUMENTS

| 2004/0180742 | A1* | 9/2004 | Ichihara | .................. F16H 55/36 474/70 |
| 2012/0323425 | A1* | 12/2012 | Suyama | ................ B60K 6/387 701/22 |
| 2013/0017916 | A1* | 1/2013 | Sada | ....................... F16D 41/06 475/5 |

FOREIGN PATENT DOCUMENTS

| JP | 2002103999 A | * | 4/2002 |
| JP | 2005 138779 | | 6/2005 |

(Continued)

OTHER PUBLICATIONS

International Search Report Issued Mar. 11, 2014 in PCT/JP13/084581 filed Dec. 25, 2013.

*Primary Examiner* — Huan Le
*Assistant Examiner* — Lori Wu
(74) *Attorney, Agent, or Firm* — Oblon, McClelland, Maier & Neustadt, L.L.P.

(57) ABSTRACT

A power transmission unit for a vehicle comprises: a motor arranged on an output side of an engine coaxially therewith in a housing adjacent to an outer face of the engine; an end cover arranged in the housing to cover an end portion of the motor to protect from the engine; a rotary shaft extending coaxially with the motor to be connected to an output shaft of the engine while penetrating through the end cover; and an engagement device disposed on an outer circumferential
(Continued)

side of the rotary shaft between the motor and the engine to selectively restrict a rotation of the rotary shaft. A sub-cover to which the rotary shaft penetrates is attached to an end face of the end cover and a chamber is hermetically enclosed by the sub-cover, the end cover, and the rotary shaft. The engagement device is held in the housing.

13 Claims, 5 Drawing Sheets (51) Int. Cl.
    *F16D 41/069*     (2006.01)
    *B60K 6/445*     (2007.10)
    *F16H 48/11*     (2012.01)

(52) U.S. Cl.
    CPC ........... *F16H 48/11* (2013.01); *Y02T 10/6239* (2013.01); *Y10S 903/913* (2013.01); *Y10S 903/952* (2013.01)

(56) References Cited

FOREIGN PATENT DOCUMENTS

| | | |
|---|---|---|
| JP | 2008 265598 | 11/2008 |
| JP | 2008 265600 | 11/2008 |
| JP | 2010 269718 | 12/2010 |
| JP | 2012225371 A * | 11/2012 |
| JP | 2014-118068 A | 6/2014 |

* cited by examiner

POWER TRANSMISSION UNIT FOR VEHICLE

TECHNICAL FIELD

The present invention relates generally to a transmission unit for transmitting power of a prime mover to drive wheels, and more particularly, to a power transmission unit used in hybrid vehicles.

BACKGROUND ART

Japanese Patent Laid-Open No. 2010-269718 describes a two-motor type hybrid drive unit. According to the teachings of Japanese Patent Laid-Open No. 2010-269718, an engine and a first motor-generator are connected to a power distribution device adapted to perform a differential action so that power of the engine is delivered to drive wheels from an output element of the power distribution device. In addition, a second motor-generator operated as a motor by an electricity generated by the first motor-generator is connected to a power transmission route between the output element and a differential gear unit. In the hybrid drive unit taught by Japanese Patent Laid-Open No. 2010-269718, specifically, the engine power is distributed to the output element and to the first motor-generator through the power distribution device. The power delivered to the first motor-generator is once converted into an electric power, and then converted into a mechanical power by the second motor-generator to be delivered to the drive wheels while being synthesized with the power delivered from the output element. The hybrid drive unit taught by Japanese Patent Laid-Open No. 2010-269718 is further provided with a one-way clutch preventing a backward rotation of the rotary element of the power distribution device connected to the engine.

The above-mentioned one-way clutch is employed to use the rotary element connected to the engine as a reaction element during propulsion of the vehicle without activating the engine. Hybrid drive units having this kind of engagement device are also described in Japanese Patent Laid-Opens Nos. 2008-265598, 2008-265600, 2005-138779 and so on.

According to the teachings of the above-listed prior art documents, the engagement device restricting a rotational direction of the rotary element connected to an output shaft (or a crankshaft) of the engine is disposed close to the engine while being exposed on the outside of the vehicle. However, such engagement device may be damaged by a heat and vibrations resulting from combustion of the engine and moisture. There is a need for preventing the one-way clutch of the engagement device from being damaged by those factors.

DISCLOSURE OF THE INVENTION

The present invention has been conceived noting the foregoing technical problem, and it is therefore an object of the present invention is to limit damage of an engagement device such as a one-way clutch disposed between an engine and a motor to restrict a rotational direction of an output shaft of the engine.

The power transmission unit of the present invention is comprised of: a motor that is arranged on an output side of an engine coaxially therewith in a housing adjacent to an outer face of the engine; an end cover that is arranged in the housing to cover an end portion of the motor to protect from the engine; a rotary shaft that extends coaxially with the motor to be connected to an output shaft of the engine while penetrating through the end cover; and an engagement device that is disposed on an outer circumferential side of the rotary shaft between the motor and the engine to selectively restrict a rotation of the rotary shaft. In order to achieve the above-explained objective, according to the present invention, the power transmission unit is provided with a sub-cover which is attached to an end face of the end cover and to which the rotary shaft penetrates, and a chamber that is hermetically enclosed by the sub-cover, the end cover and the rotary shaft whose outer diameter is smaller than an inner diameter of a stator of the motor. The aforementioned engagement device is held in the housing.

Thus, according to the present invention, the engagement device situated on the output side of the engine is held in the hermetically sealed housing so that an intrusion of foreign materials into the engagement device can be prevented. For this reason, the engagement device can be prevented from being damaged while preventing a malfunction.

The motor comprises a coil end protruding toward the engine, and the chamber is situated in an inner circumferential side of the coil end.

That is, the chamber holding the engagement device therein is arranged utilizing the inner circumferential space of the coil end so that number of parts arranged in the axial direction can be reduced to shorten an axial length of the unit.

The end cover is recessed toward the motor at an inner circumferential side of the coil end, and the chamber is formed by closing the recessed portion of the end cover opening toward the engine by the sub-cover.

That is, the engagement device can be held in the chamber formed on an outer face of the end cover so that the engagement device can be prevented from being damaged, and this makes an assembling work of the unit easier.

The engagement device may include a one-way clutch that is brought into engagement to restrict a rotation of the rotary shaft when a torque is applied to the rotary shaft in a direction opposite to a rotational direction of the engine in a self-sustaining condition.

Therefore, a reverse rotation of the output shaft of the engine or the rotary shaft connected thereto can be restricted without carrying out any specific control so that the control of the unit can be simplified. In addition, an actuator for actuating the engagement device can be eliminated so that a structure of the power transmission unit can be simplified.

Specifically, the one-way clutch comprises an inner race whose inner diameter is larger than an outer diameter of the rotary shaft, and an outer race a rotation thereof is selectively restricted. According to one aspect of the present invention, the end cover is provided with a cylindrical boss portion protruding toward the housing along an inner circumferential side of the inner race to support the inner race in a rotatable manner, and the inner race is engaged with the rotary shaft to be rotated integrally therewith. Meanwhile, the outer race is connected integrally with the end cover or the sub-cover.

Thus, both inner and outer races of the one-way clutch are supported by the end cover so that vibrations of the engine transmitted to the one-way clutch can be reduced even if the rotary shaft is connected to the engine. For this reason, the one-way clutch can be accurately supported while preventing a radial displacement thereof so that durability of the one-way clutch can be improved.

The rotary shaft is engaged with the one-way clutch through a spline, and a radial clearance of the spline is kept wider than a total radial displacement of the inner race and the rotary shaft.

Alternatively, the radial clearance in the spline may also be kept wider than a total radial displacement of the inner race, the outer race and the rotary shaft.

In the power transmission unit thus structured, a force resulting from a radial displacement of the rotary shaft caused by vibrations of the engine will not be applied to the one-way clutch so that damage of the one-way clutch can be limited.

An axial position of the outer race may be fixed by the end cover and the sub-cover.

That is, the end cover and the sub-cover also serve as positioning member for positioning the outer race in a thrust direction so that number of parts can be reduced.

In the power transmission unit, specifically, the rotary shaft, the outer race and the inner race are supported by the end cover to be fixed in a radial direction.

That is, the rotary shaft, the outer race and the inner race connected to one another are supported by the common member such as the end cover so that a relative displacement among those members can be reduced. consequently, durability of the one-way clutch can be improved.

As described, the one-way clutch comprises the inner race whose inner diameter is larger than an outer diameter of the rotary shaft, and the outer race a rotation thereof is selectively restricted. According to another aspect of the present invention, the end cover is provided with another boss portion protruding toward the housing while being engaged with an inner circumferential face of the inner race in a manner not to rotate therewith. In this case, the outer race is provided with an engagement piece that is pushed toward an inner circumferential side of the outer race to be engaged with the inner race and that is withdrawn toward an outer circumferential side of the inner race to be disengaged therefrom, and the outer race is engaged with the rotary shaft to be rotated integrally therewith. In addition, a thrust bearing is interposed between the outer race and the sub-cover to support the outer race in a rotatable manner while fixing an axial position of the outer race.

In the power transmission unit thus structured, when the engine is rotated in the forward direction thereby bringing the one-way clutch into disengagement, the outer race is rotated together with the rotary shaft so that the engagement piece is centrifugally withdrawn toward the outer circumferential side. Consequently, the engagement piece is isolated away from the inner race so that drag loss and noise resulting from a contact between those members can be reduced. In addition, durability of the one-way clutch can be improved.

Optionally, an oil hole may be formed by penetrating through the end cover to provide a communication between the chamber and a space holding the motor.

In this case, the motor can be cooled by the oil lubricating the one-way clutch serving as the engagement device.

As described, the power transmission unit may be provided with the oil hole penetrating through the end cover to provide a communication between the chamber and a space holding the motor. Specifically, an opening end of the lubrication hole of the chamber side is situated in an outer circumferential side of the outer race.

That is, the oil lubricated the one-way clutch is centrifugally scattered radially outwardly from the outer race rotated together with the rotary shaft so that the motor can be cooled by the oil delivered thereto through the oil hole.

According to the present invention, the rotary shaft may be supported by the end cover.

According to the present invention, therefore, the rotary shaft and the one-way clutch can be supported by a common member such as the end cover so that a relative displacement therebetween can be reduced thereby improving durability of the one-way clutch.

DETAILED DESCRIPTION OF THE PREFERRED EMBODIMENT(S)

Figure 1:
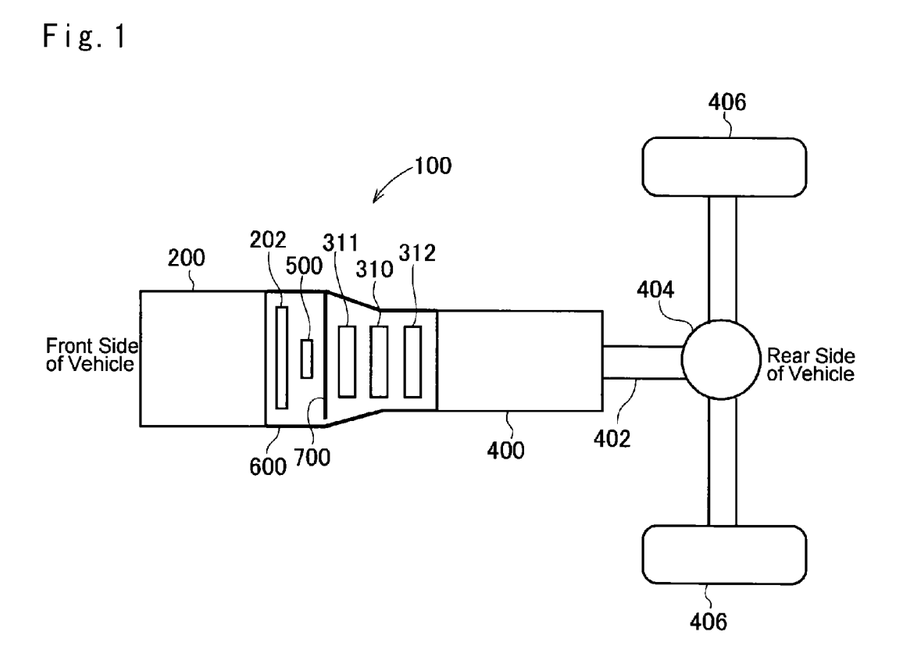
FIG. 1 is a schematic illustration of a hybrid vehicle.

Referring now to FIG. 1, there is shown an FR (front engine, rear drive) layout hybrid vehicle to which the power transmission unit of the preferred example is applied. The power transmission unit of the preferred example may also be applied to an electric vehicle in which an engine is mostly operated to generate electricity as a range extender.

The hybrid vehicle shown in FIG. 1 is comprised of a hybrid system 100, an automatic (geared) transmission 400, a propeller shaft 402, a differential gear unit 404, and a pair of rear wheels 406. The hybrid system 100 is comprised of an engine 200, a damper 202, a power distribution device (i.e., a differential) 310, a first motor-generator 311 serving as the claimed motor, a second motor-generator 312, and a one-way clutch 500.

As shown in FIG. 1, the engine 200 is disposed on the front side of the vehicle, and the damper 202, the one-way clutch 500, the first motor-generator 311, the power distribution device 310, the second motor-generator 312, and the transmission 400 are arranged in order toward the rear side. In those elements, the damper 202, the one-way clutch 500, the first motor-generator 311, the power distribution device 310, the second motor-generator 312 are held in a housing 600.

In the housing 600, an end cover 700 is arranged while being fixed thereto. An internal structure of the housing 600 will be explained later in more detail.

The transmission 400 is connected to an output shaft of the hybrid system 100 so that power delivered to the transmission 400 is further delivered to the rear wheels 406 through the propeller shaft 402 and the differential gear unit 404.

The structure of the hybrid system 100 will be explained in more detail with reference to FIGS. 2 and 3. An output shaft (i.e., a crankshaft) 201 of the engine 200 is connected to an input shaft 302 of the power distribution device 310 through the damper 202. Specifically, the damper 202 is comprised of a drive (or an input) plate and a driven (or an output) plate, and those plates are engaged through a plurality of coil springs arranged in a circumferential direction of the plates. A leading end of the input shaft 302 serving as the claimed rotary shaft is splined to the driven plate of the damper 202.

The power distribution device 310 is arranged coaxially with the engine 200 to distribute power of the engine 200 to the first motor-generator 311 and to an output shaft 304. Specifically, the power distribution device 310 is a planetary gear unit comprising a sun gear 322, a ring gear 328 arranged concentrically with the sun gear 322, pinion gears 324 interposed between the sun gear 322 and the ring gear 328 while being meshed with those gears, and a carrier 326 supporting the pinion gears 324 while allowing to rotate and revolve around the sun gear 322. The carrier 326 is connected to the engine 200 through the input shaft 302 to serve as an input element. The sun gear 322 is connected to a rotor 311R of the first motor-generator 311 through a hollow rotary shaft (i.e., a sun gear shaft) 322A to serve as a reaction element. The ring gear 328 is connected to the output shaft 304 to serve as an output element. The output shaft 304 is also connected to a rotor 312R of the second motor-generator 312 and to an input shaft (not shown) of the transmission 400. The first motor-generator 311 and the second motor-generator 312 are connected to each other through a not shown inverter and a battery to transfer electricity therebetween.

Here will be explained a power transmission through the power distribution device 310. The power of the engine 200 is delivered to the carrier 326. In this situation, given that a torque of the first motor-generator 311 is applied to the sun gear 322 in a direction to reduce a forward rotational speed, the ring gear 328 is rotated in the forward direction and the torque of the ring gear 328 is delivered to the output shaft 304. Meanwhile, the output torque of the engine 200 is applied to the first motor-generator 311 in the forward direction so that the first motor-generator 311 is operated as a generator to apply negative torque to the sun gear 322. Consequently, the power of the engine 200 delivered to the first motor-generator 311 is converted into an electric power, and delivered to the second motor-generator 312 to operate the second motor-generator 312 as a motor. That is, the power of the engine 200 is partially delivered to the output shaft 304 through the ring gear 328 of the power distribution device 310, and the remaining power is once converted into the electric power and then converted into a mechanical power again by the second motor-generator 312 to be delivered to the output shaft 304.

Figure 2:
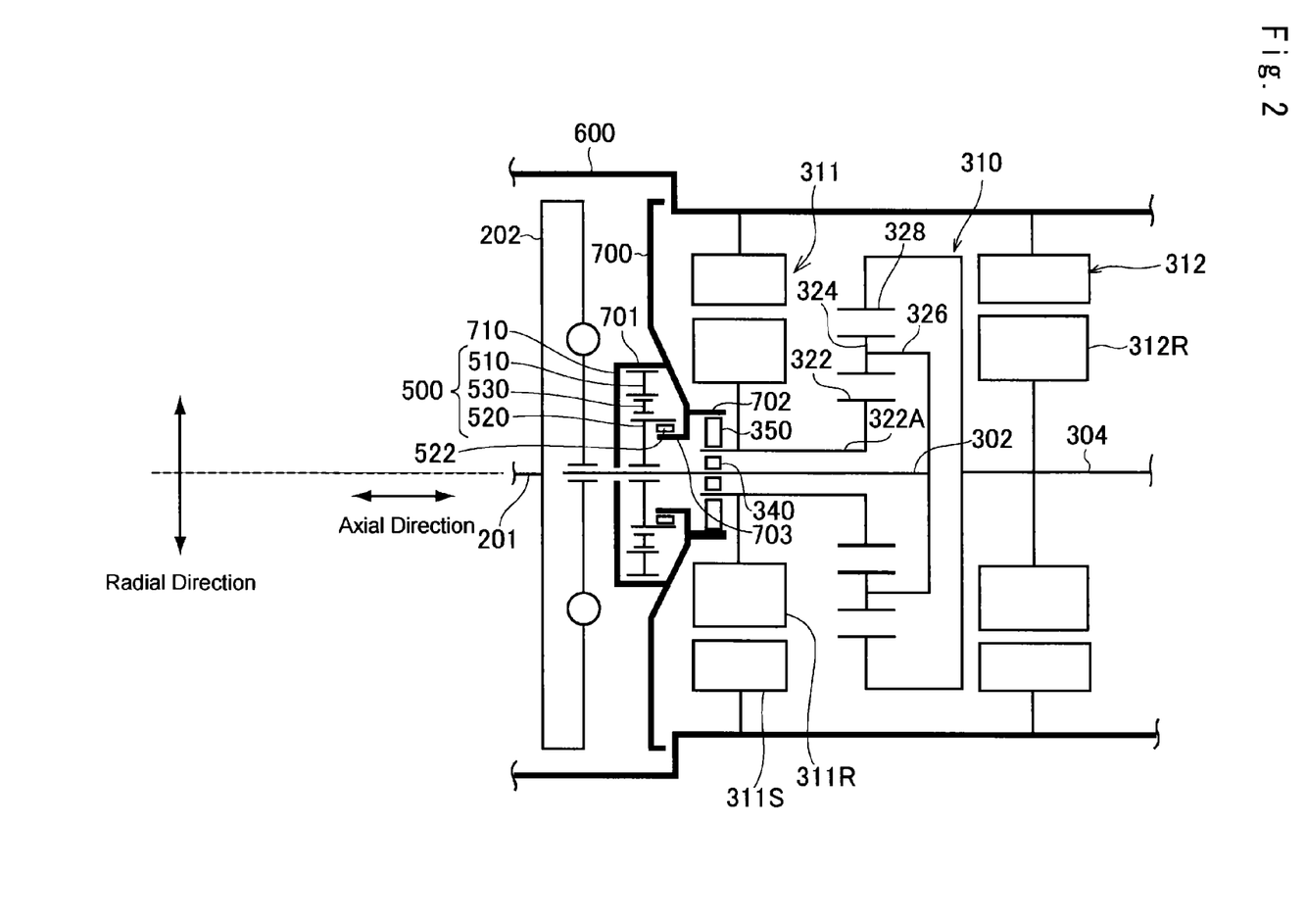
FIG. 2 is a s schematic illustration showing a structure in a housing.

As shown in FIG. 2, in the hybrid system 100, the first motor-generator 311 is disposed on the engine 200 side, and the second motor-generator 312 is disposed coaxially with the first motor-generator 311 across the power distribution device 310. As described, the power distribution device 310 and the motor-generators 311 and 312 are held in the housing 600. The one-way clutch 500 is disposed between the damper 202 (or the engine 200) and the first motor-generator 311. That is, the one-way clutch 500 is arranged closer to the engine 200 than the first motor-generator 311.

An internal space of the housing 600 is divided into two areas by a cover member 700 serving as the claimed end cover. The area where the hybrid system 100 is arranged is lubricated by oil, and the area of the engine 200 side where the damper 202 is arranged is exposed on the outside. In the hybrid system 100, the first motor-generator 311 is arranged closest to the engine 200 and hence the cover member 700 is contoured along an outline of the first motor-generator 311. An edge of the cover member 700 is fixed to an inner face of the housing 600 by a bolt 610, and the input shaft 302 penetrates through a center of the cover member 700.

The cover member 700 will be explained in more detail. Specifically, a coil end 311C protrudes from the stator 311S of the first motor-generator 311 toward the engine 200 (or the damper 202), and a leading end face of the rotor 311R is aligned with that of the stator 311S. An inner circumferential face of the rotor 311R is connected to the sun gear shaft 322A through a disk 311D recessed from the leading end face of the rotor 311R. In order to cover the first motor-generator 311 thus structured, an outer circumferential portion of the cover member 700 bulges toward the engine 200 to cover the coil end 311C. Further, a radially intermediate portion of the cover member 700 is depressed along the leading end face of the rotor 311R, and an inner circumferential portion of the cover member 700 is further depressed toward the disk 311D.

The cover member 700 serves not only as a bulkhead of the housing 600 but also as a supporting member. To this end, the cover member 700 is provided with a first boss portion 701 protruding from the radially intermediate portion toward the engine 200, a second boss portion 702 protruding from the radially inner portion toward the first motor-generator 311 along an inner circumferential face of the rotor 311R, and a third boss portion 703 protruding from the radially innermost portion toward the engine 200 to form an insertion hole to which the input shaft 302 is inserted.

A sub-cover 710 is attached to an end face of the first boss portion 701 (facing to the damper 202) by a bolt 711, and a seal ring 705 is interposed between the sub-cover 710 and the end face of the first boss portion 701 to ensure a liquid-tight condition. Specifically, the sub-cover 710 is an annular member having a through hole to which the input shaft 302 is inserted, and an oil seal 713 is interposed between an inner circumferential edge of the through hole and the input shaft 302 to seal a clearance therebetween liquid-tightly. A space enclosed hermetically by the inner circumferential portion of the cover member 700 recessed toward the rotor 311R, the sub-cover 710, and the input shaft 302 serves as a clutch chamber 620 corresponding to the claimed chamber. In the housing 600, a space outside of the cover member 700 serves as a damper chamber 630 where the damper 202 is arranged, and a space inside of the cover member 700 serves as a motor chamber 640 where the hybrid system 100 including the first motor-generator 311 etc. are arranged.

The one-way clutch 500 serving as the claimed engagement device is held in the aforementioned clutch chamber 620. Specifically, the one-way clutch 500 is brought into engagement when a torque is applied to the input shaft 302 in a backward direction (opposite to a rotational direction of the engine 200 in a self-sustaining condition) to restrict rotations of the input shaft 302 and the output shaft 201 of the engine 200. Thus, according to the preferred example, the engagement device for selectively restricting the rotational direction of the input shaft 302 or the output shaft 201 of the engine 200 is arranged utilizing the space created in the radially inner side of the coil end 311C. For this reason, an axial length of the power transmission unit can be shortened so that the it can be downsized.

Figure 3:
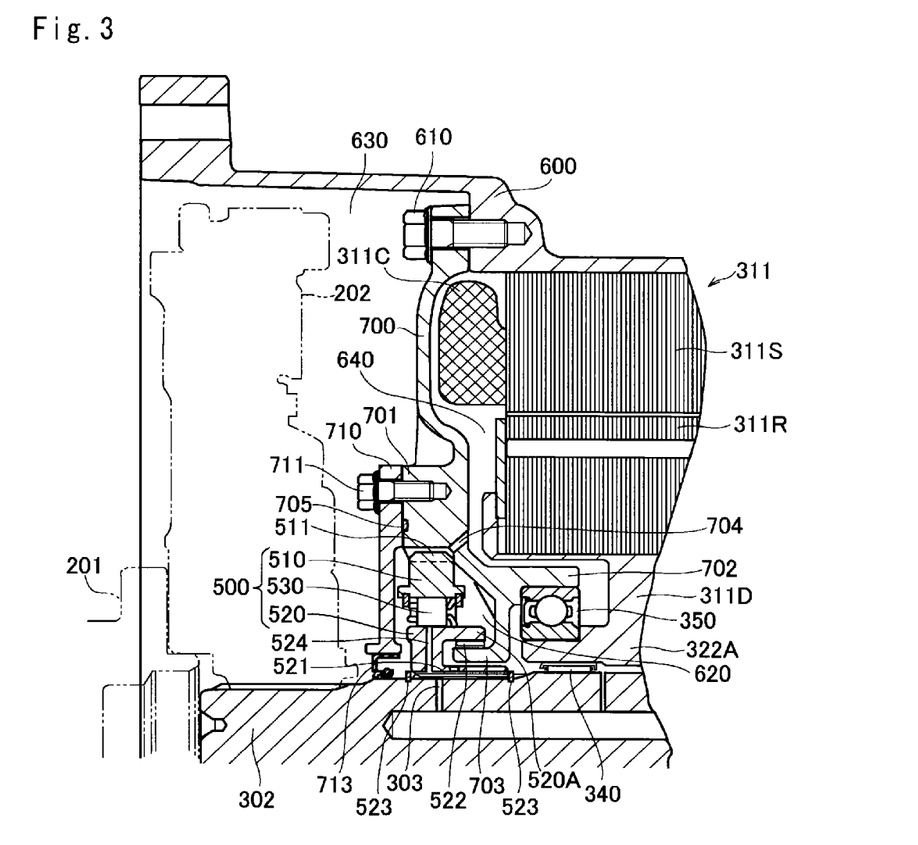
FIG. 3 is a cross-sectional view showing one example of the one-way clutch held in the housing.

Specifically, the one-way clutch 500 shown in FIG. 3 is a sprag clutch comprising an outer race 510, an inner race 520, and a sprag 530 disposed between an inner circumferential face of the outer race 510 and an outer circumferential face of the inner race 520. The one-way clutch 500 is situated in an inner circumferential side of the first boss portion 701 of the cover member 700 and the outer race 510 is engaged with the inner circumferential face of the first boss portion 701 through a spline 511 in a manner not to rotate relatively therewith. Spline teeth of the outer race 510 are engaged with spline teeth of the first boss portion 701 while brought into abutment with a surface of the cover member 700. In addition, a face of the outer race 510 (facing to the sub-cover 700) is also brought into abutment with an inner face of the sub-cover 700 so that an axial position of the outer race 510 is fixed by the cover member 700 and the sub-cover 710. Thus, the cover member 700 and the sub-cover 710 also serve as fixing members to reduce number of parts.

The inner race 520 is provided with a cylindrical portion 520A protruding along an outer circumferential face of the third boss portion 703 toward the cover member 700, and a bearing 522 is interposed between an inner circumferential face of the cylindrical portion 520A and an outer circumferential face of the third boss portion 703. Thus, the inner race 520 is supported by the cover member 700 through the bearing 522 while being rotated relatively. In addition, the inner race 520 is engaged with the input shaft 302 through a spline 521 to be rotated integrally therewith. An axial position of the inner race 520 is fixed by a pair of snap rings 523 fitted onto the input shaft 302 on both sides of the spline 521. Thus, the one-way clutch 500 connects the input shaft 302 to the cover member 700 but entirely supported by the cover member 700.

Here will be explained a lubrication system for the one-way clutch 500. The input shaft 302 is provided with an oil hole 303 radially penetrating therethrough from a center hollow space toward the inner circumferential face of the inner race 302. The inner race 520 is also provided with an oil hole 524 penetrating therethrough from the inner circumferential face to the outer circumferential face. Accordingly, the oil in the input shaft 302 is centrifugally delivered to the sprag 530 through the oil hole 303 and the oil hole 524 of the inner race 520 while lubricating the spline 521. Further, an oil hole (or a lubrication hole) 704 penetrates through the cover member 700 to provide a communication between an outer circumferential portion of the clutch chamber 620 and the motor chamber 640 so that the first motor-generator 311 can be cooled by the oil delivered thereto from the clutch chamber 620 through the oil hole 704.

Here will be explained a supporting structure for the input shaft 302 and the rotor 311R. A leading end of the sun gear shaft 322A extends along an inner circumferential side of the second boss portion 702, and a bearing 350 is interposed between an inner circumferential face of the second boss portion 702 and an outer circumferential face of the sun gear shaft 322A to support sun gear shaft 322A in a rotatable manner. The input shaft 302 penetrates through the sun gear shaft 322A along a center axis thereof, and a bearing 340 is interposed between an outer circumferential face of the input shaft 302 and an inner circumferential face of the sun gear shaft 322A to support the input shaft 302 in a rotatable manner. Thus, the input shaft 302 is supported by the sun gear shaft 322A through the bearing 340, and the sun gear shaft 322A is supported by the cover member 700 through the bearing 350. That is, the input shaft 302 is supported by the cover member 700.

In the power transmission unit according to the preferred example, the one-way clutch 500 is disposed closely to the engine 200 and hence vibrations of the engine 200 are transmitted thereto. However, all of the outer race 510 and the inner race 520 of the one-way clutch 500, and the input shaft 302 are supported by a common member such as the cover member 700. Specifically, the outer race 500 is supported by the cover member 700 through the spline 511, the inner race 520 is supported by the cover member 700 through the bearing 522, and the input shaft 302 is by the cover member 700 through the bearing 340, the sun gear shaft 322A and the bearing 350. Since the rotary members of the one-way clutch 500 rotating relatively each other are thus supported by the single member, the one-way clutch 500 can be supported accurately while reducing vibrations transmitted thereto. For these reasons, it is possible to limit damage from the one-way clutch 500.

According to the foregoing example, especially, a radial movement of the one-way clutch 500 and a radial movement of the input shaft 302 are restricted by a common member such as the cover member 700 so that a total displacement of the one-way clutch 500 and the input shaft 302 in the radial direction can be restricted accurately. For this reason, a radial force acting on the one-way clutch 500 can be reduced so that the one-way clutch 500 and peripheral equipment can be prevented from being damaged. In addition, a radial movement of the outer race 510 is also restricted by the cover member 700 so that chattering of the one-way clutch 500 and the cover member 700 can be suppressed.

Figure 4:
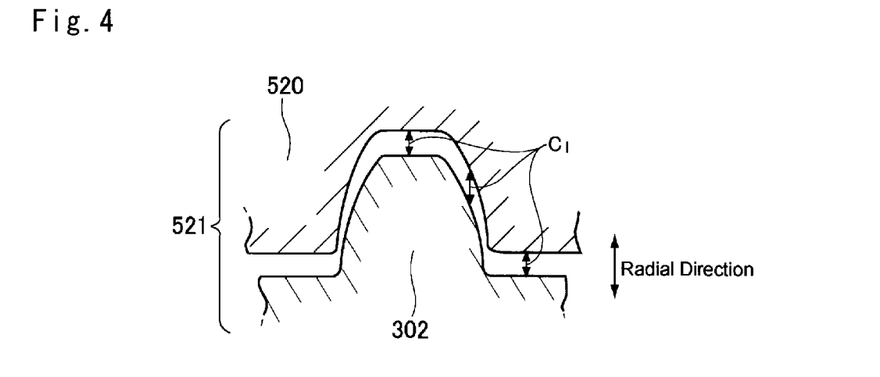
FIG. 4 a close-up showing a spline of an inner race.

Here will be explained a radial clearance Cl in the spline 521 with reference to FIG. 4 showing a cross-section of the spline 521 connecting the inner race 520 and the input shaft 320 in an enlarged scale. According to the example shown in FIG. 4, the radial clearance Cl of the spline 521 is kept wider than a total radial displacement of the inner race 520 and the input shaft 320. The total amount of displacement of the inner race 520 and the input shaft 320 in the radial direction may be estimated based on a result of a simulation for an operation of the power transmission unit. Alternatively, the radial clearance Cl in the spline 521 may also be set to be wider than a total radial displacement of the inner race 520, the input shaft 320 and the outer race 510. In this case, a radial force acting on inner race 520 of the one-way clutch 500 can be suppressed even if the input shaft 302 is displaced significantly in the radial direction so that the one-way clutch 500 can be prevented from being damaged.

Figure 5:
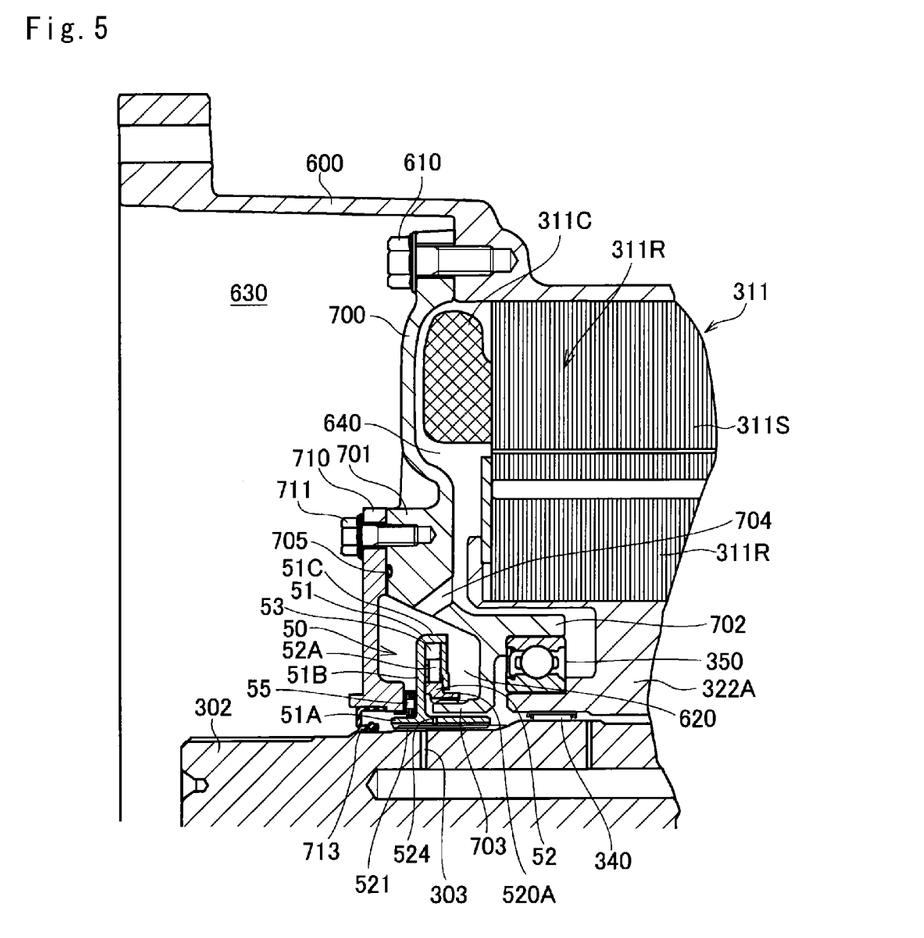
FIG. 5 is a cross-sectional view showing another example of the one-way clutch held in the housing.
Figure 6:
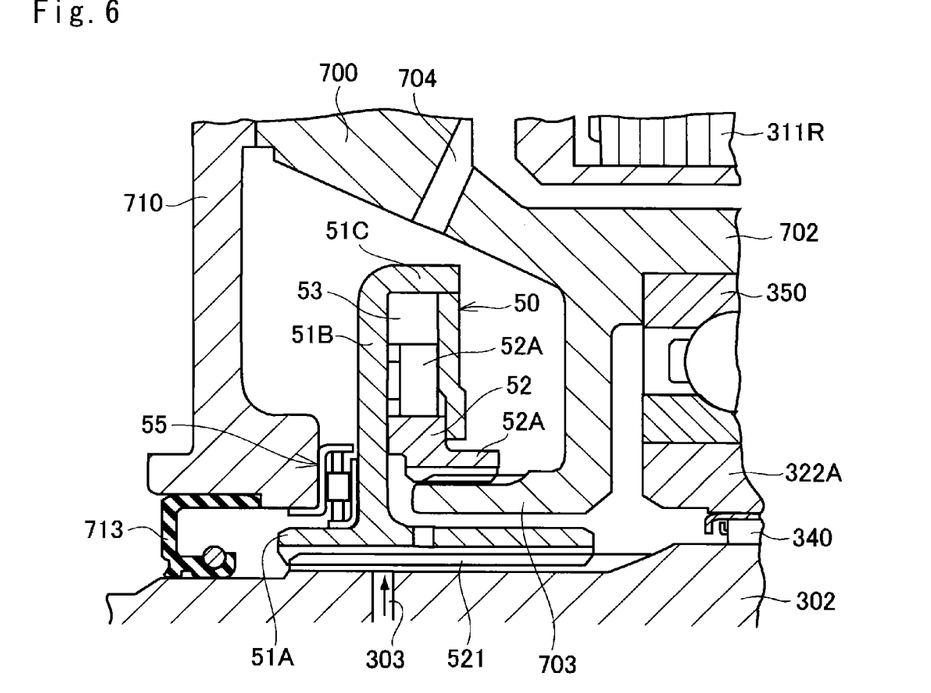
FIG. 6 is a close-up showing a one-way clutch according to another example shown in FIG. 5.
Figure 7:
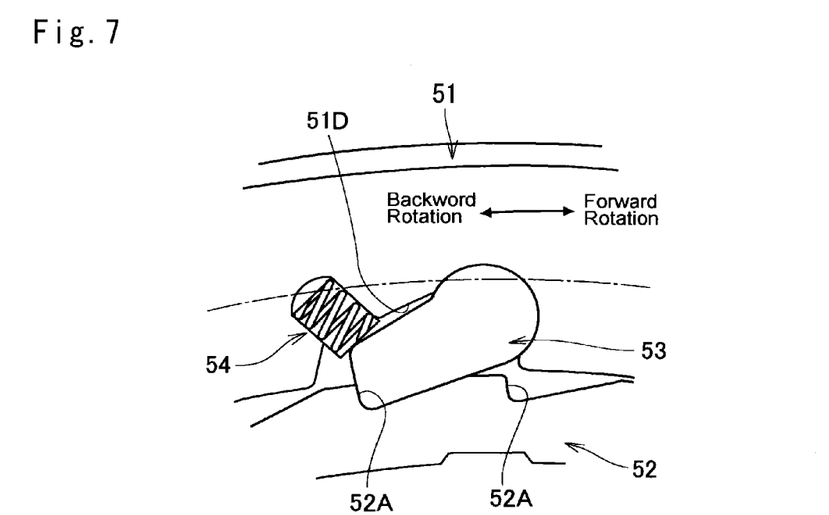
FIG. 7 is a skeleton diagram showing a structure of pawl of the one-way clutch.

Next, another example of the power transmission unit using a ratchet type one-way clutch 50 will be explained with reference to FIGS. 5 to 7. In FIGS. 5 to 7, common reference numerals are allotted to the elements in common with those shown in in FIGS. 1 to 4, and detailed explanations for those common elements will be omitted. FIG. 5 is a partial cross-sectional view as the above-explained FIG. 3, and FIG. 6 is a close-up showing the one-way clutch 50. As illustrated in those figures, the one-way clutch 50 is held in the clutch chamber 620. An outer race 51 is engaged with the input shaft 302 through the spline 521, and an inner race 52 is also splined to the outer circumferential face of the third boss portion 703 of the cover member 700.

The outer race 51 is provided with a disk 51B protruding radially from a cylindrical portion 51A, and a circumferentially outermost portion of the disk 51B is bent to form an outer cylinder 51C. A plurality of pawls 53 serving as the claimed engagement piece are arranged in an inner circumferential side of the outer cylinder 51C. To this end, a plurality of recesses 51D are formed on an inner circumferential face of the outer cylinder 51C by depressing the inner circumferential face radially outwardly, and the pawls 53 are individually held in each recess 51D.

The pawl 53 is attached to the outer cylinder 51C at one of end portions thereof in a pivotal manner, and an elastic member 54 is arranged on a leading end side of the pawl 53 to push the leading end portion of the pawl 53 toward an inner circumferential side of the outer race 51 (i.e., toward the inner race 52). Specifically, an elastic force of the elastic member 54 is set to be comparable with a centrifugal force applied to the pawl 53 at a predetermined rotational speed of the outer race 51. That is, when the outer race 51 is rotated together with the input shaft 302 at a speed higher than the predetermined speed, the pawl 53 is centrifugally withdrawn into the recess 51D while compressing the elastic member 54. By contrast, when the rotational speed of the outer race 51 is rotated together with the input shaft 302 is lower than the predetermined speed, the leading end portion of the pawl 53 is pushed by the elastic member 54 toward the inner race 52. On the other hand, the inner race 52 is provided with a plurality of notches 52A at regular intervals so that the leading end of each pawl 53 is individually engaged with the notch 52A in a predetermined direction (when the outer race 51 is rotated in an anticlockwise in FIG. 7).

That is, when a torque is applied to the input shaft 302 in a backward direction (i.e., the counterclockwise in FIG. 7), the pawl 53 arranged on the outer race 51 is engaged with the notch 52A to restrict a backward rotation of the input shaft 302. By contrast, when the input shaft 302 is rotated in a forward direction (i.e., the clockwise in FIG. 7), the pawl 53 is withdrawn into each recess 51D while compressing the elastic member 54 repeatedly. Thus, the pawl 53 will not be engaged with the notch 52A in this case so that the input shaft 302 is allowed to rotate in the forward direction. In this situation, the leading end portion of the pawl 53 is pushed toward the inner circumferential side by the elastic member 54 while being brought into contacted repeatedly to a tooth bottom of the notch 52A. Then, when the rotational speed of the input speed exceeds the predetermined speed, the pawl 53 is circumferentially withdrawn into the recess 51D to be isolated away from the outer circumferential face of the inner race 52 so that drag loss resulting from a contact between those members can be reduced. In addition, noise resulting from repetitive collision between the pawl 53 and the tooth bottom of the notch 52A can be reduced.

A thrust bearing 55 is interposed between a back face of the disk 51B of the outer race 51 and an inner circumferential face of the sub-cover 710. The inner race 52 forming the one-way clutch 50 together with outer race 51 is splined to the third boss portion 703 to fix an axial position thereof so that an axial position of the one-way clutch 50 is fixed by the third boss portion 703 and the thrust bearing 55.

According to the example shown in FIGS. 5 to 7, the oil hole 704 is formed on the outer circumferential side of the outer race 51 to provide a communication between the clutch chamber 620 and the motor chamber 640. Upon rotation of the outer race 51 together with the input shaft 302, the oil adhering to the outer race 51 is centrifugally scattered radially outwardly so that the first motor-generator 311 can be cooled by the oil delivered thereto through the oil hole 704.

Thus, according to another example of the power transmission unit shown in FIGS. 5 to 7, the clutch chamber 620 enclosed by the cover member 700 and the sub-cover 410 is also sealed liquid-tightly so that an intrusion of foreign material can be prevented. For this reason, the one-way clutch 50 held in the clutch chamber 620 can be prevented from being damaged to ensure durability thereof.

The present invention should not be limited to the foregoing preferred examples. For instance, a dog clutch, a friction clutch, an electromagnetic clutch etc. may also be used as the claimed engagement device instead of the one-way clutch. In addition, given that the power transmission unit of the present invention is applied to the hybrid vehicle, the second motor-generator may be connected to a wheel that is not rotated by the engine power instead of being connected to the output shaft.

REFERENCE SIGNS LIST

100: hybrid system; 200: engine; 202: damper; 302: input shaft; 303, 704: oil hole; 304: output shaft; 310: power distribution device; 311: first motor-generator; 311C: coil end; 611S: stator; 312: second motor-generator; 322: sun gear; 322A: sun gear shaft; 324: pinion gear; 326: carrier; 328: ring gear; 340, 350: bearing; 400: automatic transmission; 402: propeller shaft; 404: differential gear unit; 406: rear wheels; 50, 500: one-way clutch; 51, 510: outer race; 511, 521: spline; 52, 520: inner race; 52A: notch; 53: pawl; 530: sprug; 54: elastic member; 55: thrust bearing; 600: housing; 620: clutch chamber; 700: cover member; 701 to 703: boss portions; 710: sub-cover; 713: oil; seal; Cl: clearance.

The invention claimed is:

1. A power transmission unit for a vehicle, comprising:
a motor that is arranged on an output side of an engine coaxially therewith in a housing adjacent to an outer face of the engine;
an end cover that is arranged in the housing and fixed to an inner face of the housing to cover a coil end of the motor protruding toward the engine to protect the motor from the engine;
a rotary shaft that extends coaxially with the motor to be connected to an output shaft of the engine while penetrating through the end cover, the rotary shaft including an outer diameter smaller than an inner diameter of a stator of the motor;
an engagement device that is disposed on an outer circumferential side of the rotary shaft between the motor and the engine to selectively restrict a rotation of the rotary shaft;
a sub-cover which is liquid-tight attached to an end face of the end cover and to which the rotary shaft penetrates; and
a chamber that is enclosed by the sub-cover, the end cover, and the rotary shaft;
wherein the engagement device is held in the chamber.

2. The power transmission unit for a vehicle as claimed in claim 1,
wherein the chamber is situated in an inner circumferential side of the coil end.

3. The power transmission unit for a vehicle as claimed in claim 2,
wherein the end cover includes a recessed portion toward the motor at an inner circumferential side of the coil end; and
wherein the chamber is formed by closing the recessed portion of the end cover opening toward the engine by the sub-cover.

4. The power transmission unit for a vehicle as claimed in claim 1,
wherein the engagement device includes a one-way clutch that is brought into engagement to restrict a rotation of the rotary shaft when a torque is applied to the rotary shaft in a direction opposite to a rotational direction of the engine in a self-sustaining condition.

5. The power transmission unit for a vehicle as claimed in claim 4,
wherein the one-way clutch comprises an inner race whose inner diameter is larger than an outer diameter of the rotary shaft, and an outer race;

wherein the end cover is provided with a cylindrical boss portion protruding toward the housing along an inner circumferential side of the inner race to support the inner race in a rotatable manner; and wherein the inner race is engaged with the rotary shaft to be rotated integrally therewith, and the outer race is connected integrally with the end cover or the sub-cover.

6. The power transmission unit for a vehicle as claimed in claim 5, wherein the rotary shaft is engaged with the one-way clutch through a spline; and wherein a radial clearance of the spline is kept wider than a total radial displacement of the inner race and the rotary shaft.

7. The power transmission unit for a vehicle as claimed in claim 6, wherein the radial clearance in the spline is wider than a total radial displacement of the rotary shaft, the inner race and the outer race.

8. The power transmission unit for a vehicle as claimed in claim 5, wherein an axial position of the outer race is fixed by the end cover and the sub-cover.

9. The power transmission unit for a vehicle as claimed in claim 5, wherein the rotary shaft, the outer race and the inner race are supported by the end cover to be fixed in a radial direction.

10. The power transmission unit for a vehicle as claimed in claim 4, wherein the one-way clutch comprises an inner race whose inner diameter is larger than an outer diameter of the rotary shaft, and an outer race;

wherein the end cover is provided with a boss portion protruding toward the housing while being engaged with an inner circumferential face of the inner race in a manner not to rotate therewith;

wherein the outer race comprises an engagement piece that is pushed toward an inner circumferential side of the outer race to be engaged with the inner race, and that is centrifugally withdrawn from the inner race to be disengaged therefrom;

wherein the outer race is engaged with the rotary shaft to be rotated integrally therewith; and wherein a thrust bearing is interposed between the outer race and the sub-cover to support the outer race in a rotatable manner while fixing an axial position of the outer race.

11. The power transmission unit for a vehicle as claimed in claim 10, further comprising:

an oil hole penetrating through the end cover to provide a communication between the chamber and a space holding the motor; and wherein an opening end of the oil hole toward the chamber is situated in an outer circumferential side of the outer race.

12. The power transmission unit for a vehicle as claimed in claim 10, wherein the rotary shaft is supported by the end cover.

13. The power transmission unit for a vehicle as claimed in claim 1, further comprising:

an oil hole penetrating through the end cover to provide a communication between the chamber and a space holding the motor.

* * * * *